US012731820B2

(12) United States Patent
Wang et al.

(10) Patent No.: US 12,731,820 B2
(45) Date of Patent: Sep. 8, 2026

(54) BATTERY AND POWER CONSUMING DEVICE

(71) Applicant: JIANGSU CONTEMPORARY AMPEREX TECHNOLOGY LIMITED, Changzhou (CN)

(72) Inventors: Chong Wang, Changzhou (CN); Qifeng Chen, Changzhou (CN); Mu Qian, Changzhou (CN); Zhanyu Sun, Changzhou (CN)

(73) Assignee: JIANGSU CONTEMPORARY AMPEREX TECHNOLOGY LIMITED, Changzhou (CN)

(*) Notice: Subject to any disclaimer, the term of this patent is extended or adjusted under 35 U.S.C. 154(b) by 570 days.

(21) Appl. No.: 18/348,358

(22) Filed: Jul. 7, 2023

(65) Prior Publication Data

US 2023/0352751 A1 Nov. 2, 2023

Related U.S. Application Data

(63) Continuation of application No. PCT/CN2021/106849, filed on Jul. 16, 2021.

(51) Int. Cl.

*H01M 10/42* (2006.01)
*H01M 10/48* (2006.01)
*H01M 50/569* (2021.01)

(52) U.S. Cl.

CPC ....... *H01M 10/425* (2013.01); *H01M 10/486* (2013.01); *H01M 50/569* (2021.01); *H01M 2010/4278* (2013.01)

(58) Field of Classification Search

CPC ............ H01M 10/425; H01M 10/486; H01M 50/569; H01M 2010/4278; H01M 2220/20; H01M 2220/30; G01K 1/14; Y02E 60/10

See application file for complete search history.

(56) References Cited

U.S. PATENT DOCUMENTS

| | | | | |
|---|---|---|---|---|
| 10,714,796 | B2 | 7/2020 | Sei et al. | |
| 2018/0342775 | A1* | 11/2018 | Sei | H01M 50/507 |
| 2019/0113392 | A1* | 4/2019 | Matsumura | H01M 50/553 |

FOREIGN PATENT DOCUMENTS

| | | | |
|---|---|---|---|
| CN | 101981758 | A | 2/2011 |
| CN | 205792061 | U | 12/2016 |

(Continued)

OTHER PUBLICATIONS

Notice of Reasons for Refusal received in the corresponding Japanese Application 2023-509571, mailed on Apr. 1, 2024.

(Continued)

*Primary Examiner* — Lisa S Park

(74) *Attorney, Agent, or Firm* — K&L Gates LLP

(57) ABSTRACT

The present application relates to a battery and a power consuming device. The battery includes: a battery cell; a temperature sensor for measuring the temperature of the battery cell; a sensor mounting assembly for mounting the temperature sensor; and a signal transmission component for being electrically connected to the temperature sensor to transmit a temperature signal of the battery cell, the signal transmission component being detachably connected to the sensor mounting assembly. The replaceability and compatibility of the temperature sensor can be improved to facilitate the maintenance of the battery and the replacement of a failure apparatus, and reduce the cost of the battery and the scrapping probability of the entire battery.

16 Claims, 7 Drawing Sheets

(56) References Cited

FOREIGN PATENT DOCUMENTS

| | | | |
|---|---|---|---|
| CN | 206756321 | U | 12/2017 |
| CN | 108931308 | A | 12/2018 |
| CN | 111816946 | A | 10/2020 |
| CN | 112134066 | A | 12/2020 |
| CN | 212461950 | U | 2/2021 |
| JP | 2010033920 | A | 2/2010 |
| JP | 2013093227 | A | 5/2013 |
| JP | 2015056400 | A | 3/2015 |
| JP | 2015230200 | A | 12/2015 |
| JP | 2016072181 | A | 5/2016 |
| JP | 2018197682 | A | 12/2018 |
| JP | 2022159153 | A | 10/2022 |

OTHER PUBLICATIONS

International Search Report received in the corresponding International Application PCT/CN2021/106849, mailed Apr. 2, 2022.
Written Opinion received in the corresponding International Application PCT/CN2021/106849, mailed Apr. 2, 2022.
The first office action received in the corresponding Chinese Application 202110808187.8, mailed Aug. 23, 2021.

* cited by examiner

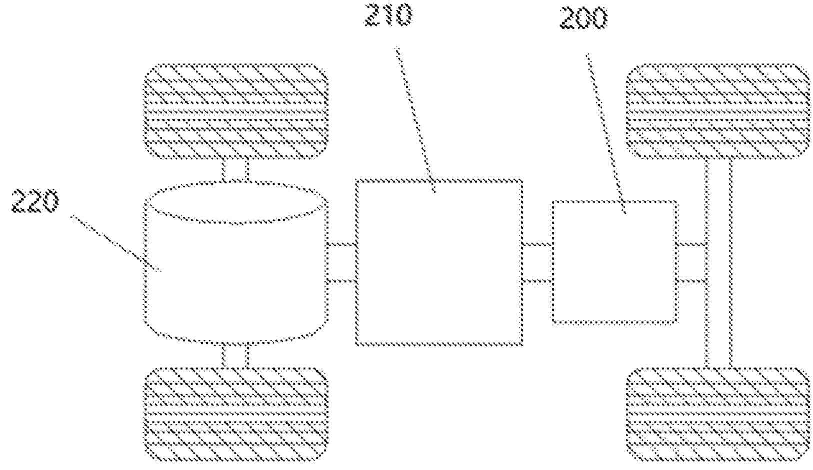
*FIG. 1-A*
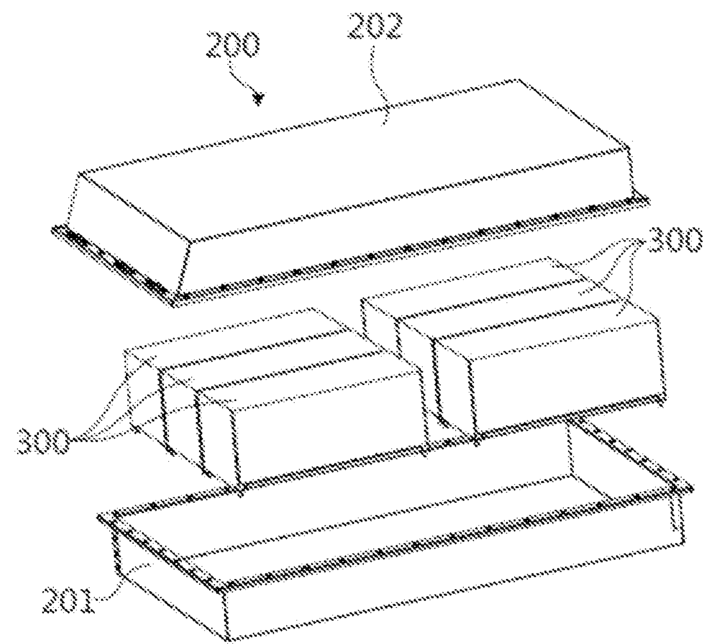
*FIG. 1-B*

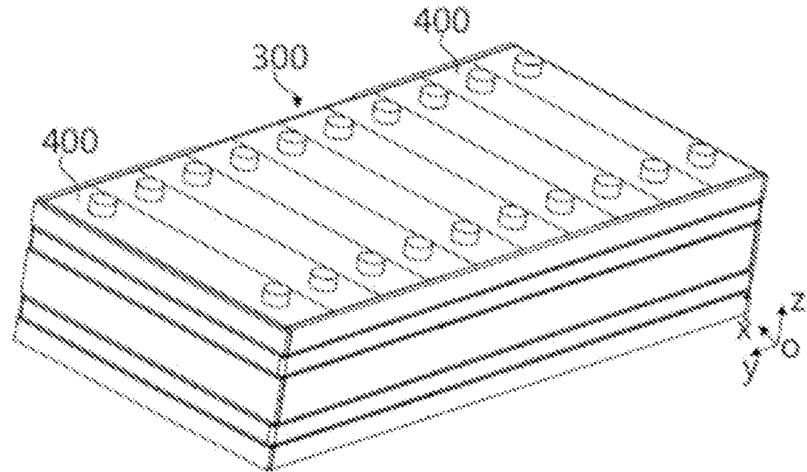
FIG. 1-C

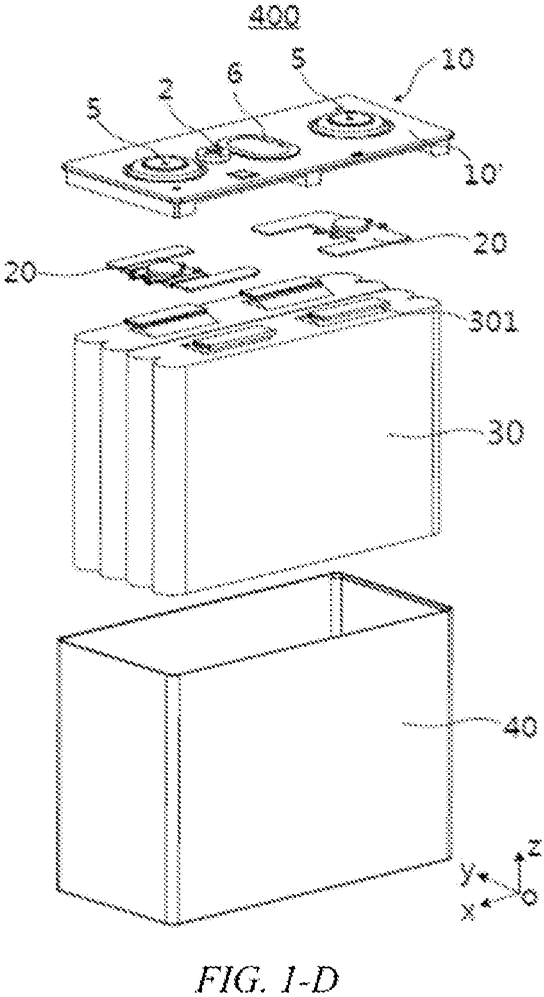
FIG. 1-D

BATTERY AND POWER CONSUMING DEVICE

CROSS REFERENCE TO RELATED APPLICATIONS

The present application is a continuation of International Application PCT/CN2021/106849, filed on Jul. 16, 2021 and entitled "BATTERY AND POWER CONSUMING DEVICE", the entire disclosure of which is incorporated herein by reference.

TECHNICAL FIELD

The present application relates to the technical field of batteries, and in particular to a battery and a power consuming device.

BACKGROUND ART

As a new significant power energy, batteries are increasingly focused. In order to predict the possibility of explosion caused by overheating, currently, a temperature sensing structure for temperature acquisition is generally added to the battery to measure the temperature of a battery unit in a battery module.

However, the existing temperature sensing structure is mainly fixed on the battery unit by dispensing, welding, etc., and thus has a poor universality, and lacks maintainability.

SUMMARY OF THE INVENTION

The present application provides a battery and a power consuming device, which may improve the universality and maintainability of a temperature sensing structure.

In a first aspect, the present application provides a battery, comprising:

- a battery cell;
- a temperature sensor for measuring the temperature of the battery cell;
- a sensor mounting assembly for mounting the temperature sensor; and
- a signal transmission component for being electrically connected to the temperature sensor to transmit a temperature signal of the battery cell, the signal transmission component being detachably connected to the sensor mounting assembly.

In some embodiments, one side of the sensor mounting assembly is provided with a connection port, and the sensor mounting assembly is detachably connected to the signal transmission component at the connection port.

In some embodiments, the sensor mounting assembly further comprises:

- a lead-out terminal provided at the connection port, the lead-out terminal being configured for connecting the temperature sensor and the signal transmission component.

In some embodiments, one end of the lead-out terminal is connected to the temperature sensor, the other end of the lead-out terminal is provided with an elastic connection portion, and the signal transmission component is inserted into the connection port and is detachably connected to the elastic connection portion.

In some embodiments, the other end of the lead-out terminal is bent to form the elastic connection portion.

In some embodiments, the other end of the lead-out terminal is bent towards a side surface of the lead-out terminal, and spaced apart from the side surface by a preset distance.

In some embodiments, the sensor mounting assembly comprises a first housing and a second housing connected to each other, the temperature sensor being arranged at the first housing, and the lead-out terminal and the connection port being arranged at the second housing.

In some embodiments, the first housing is detachably connected to the second housing.

In some embodiments, the sensor mounting assembly further comprises a thermally conductive member, the thermally conductive member being configured for transferring the temperature of the battery cell to the temperature sensor.

In some embodiments, the first housing and/or the second housing are/is detachably connected to the thermally conductive member.

In some embodiments, the sensor mounting assembly comprises at least two lead-out terminals, and further comprises a separation portion, the separation portion being configured for separating adjacent lead-out terminals from each other.

In some embodiments, the signal transmission component comprises a contact end and a transmission end connected to each other;

- the contact end is configured for being in contact connection with the lead-out terminal; and
- the transmission end is configured for transmitting the temperature signal of the battery cell.

In some embodiments, the sensor mounting assembly is detachably provided on the battery cell.

In some embodiments, one of the sensor mounting assembly and the battery cell is provided with a snap-fit member, and the other one is provided with an engagement groove, the snap-fit member being connected to the engagement groove, so that the sensor mounting assembly is detachably connected to the battery cell.

In a second aspect, the present application provides a power consuming device, comprising a battery in the embodiment described above, the battery being configured for supplying electric energy.

According to the battery provided in the embodiment of the present application, the signal transmission component is detachably connected to the sensor mounting assembly, which is conducive to the independent design, processing, maintenance, and replacement of the signal transmission component and the sensor mounting assembly. Moreover, the sensor mounting assembly is detachably connected to the battery cell, so that when the temperature sensor has a fault and is required to be detected or replaced, the sensor mounting assembly may be directly removed from the battery cell, which improves the replaceability and compatibility of the temperature sensor to facilitate the maintenance of the battery and the replacement of a failure apparatus, and reduce the cost of the battery and the scrapping probability of the entire battery.

BRIEF DESCRIPTION OF THE DRAWINGS

In order to more clearly illustrate the technical solutions in the embodiments of the present application or in the prior art, the accompanying drawings to be used in the description of the embodiments or the prior art will be described briefly below. Obviously, the accompanying drawings in the following description are merely some embodiments of the present application. For those of ordinary skill in the art, other accompanying drawings may also be derived from these accompanying drawings without involving any inventive effort.

The accompanying drawings described herein are intended to provide a further understanding of the present application, which constitutes a part of the present application. The schematically embodiments of the present application and the description thereof are intended to explain the present application, and do not constitute an undue limitation on the present application.

FIG. 1-A is a schematic structural diagram of a power consuming device according to an embodiment of the present application.

FIG. 1-B is a schematic structural diagram of a battery according to an embodiment of the present application.

FIG. 1-C is a schematic structural diagram of a battery module according to an embodiment of the present application.

FIG. 1-D is a schematic structural diagram of a battery cell according to an embodiment of the present application.

DETAILED DESCRIPTION OF EMBODIMENTS

Figure 2:
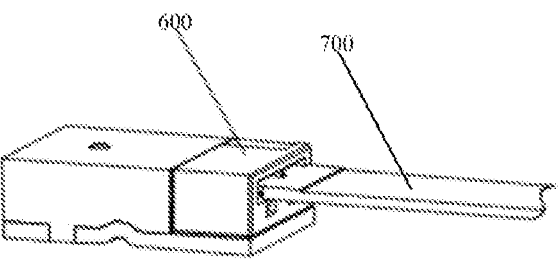
FIG. 2 is a schematic assembly diagram of a sensor mounting assembly and a signal transmission component in a battery according to an embodiment of the present application.

In order to make the objective, technical solutions, and advantages of the present application clearer, the present application is further described in detail below with reference to the accompanying drawings and the embodiments. It should be understood that the specific embodiments described herein are merely used for explaining the present application, which are preferred embodiments of the present application, and do not limit the scope of protection of the present application accordingly. Therefore, any equivalent changes made according to the structure, shape, and principle of the present application shall all fall within the scope of protection of the present application.

Unless otherwise defined, all technical and scientific terms used herein have the same meanings as those commonly understood by those skilled in the art to which the present application belongs. The terms used in the description of the present application herein are merely for the purpose of describing the specific embodiments, but are not intended to limit the present application. The terms “comprising”, “having”, and any variations thereof in the description, claims as well as the brief description of the drawings of the present application are intended to cover the non-exclusive inclusion.

The phrase “embodiment” mentioned herein means that the specific features, structures, or characteristics described in conjunction with the embodiment may be encompassed in at least one embodiment of the present application. The phrase “embodiment” in various places in the description does not necessarily refer to the same embodiment, nor is it an independent or alternative embodiment exclusive of other embodiments. Those skilled in the art understand explicitly or implicitly that the embodiment described herein may be combined with another embodiment.

The term “and/or” herein is merely a description of the associated relationship of associated objects, and indicates that three relationships may exist. For example, A and/or B may indicate that three instances of A alone, A and B simultaneously, and B alone. Moreover, the character “/” herein generally indicates an “or” relationship between the associated objects.

In addition, the terms “first”, “second”, etc. in the description, claims, or accompanying drawings described above of the present application are used for distinguishing different objects, rather than to describe a specific order, and thus may explicitly or implicitly comprise one or more features.

In the description of the present application, unless otherwise stated, “a plurality of” means two or more (including two), and similarly, “a plurality of groups” means two or more groups (including two groups).

In the description of the present application, it should be noted that unless otherwise explicitly specified and defined, the terms “mounting”, “connected”, and “connection” should be understood in a broad sense. For example, “connected” or “connection” of mechanical structures may be a physical connection. For example, the physical connection may be a fixed connection, by means of, for example, a fixing member, such as a screw, a bolt, etc.; or the physical connection may be a detachable connection, for example, a mutual snap-fit or bayonet connection; or the physical connection may be an integral connection, by, for example, welding, bonding, or integral molding. In addition to a physical connection, “connected” or “connection” of circuit structures may be an electrical connection or a signal connection. For example, it may be a direct connection, that is, the physical connection, or an indirect connection by means of at least one intermediate element, as long as the circuits are connected. It may also be internal communication between two elements. In addition to a signal connection by means of a circuit, the signal connection may be a signal connection by means of a media medium, such as radio waves. For those of ordinary skill in the art, the specific meaning of the terms described above in the embodiments of the present application may be understood according to specific situations.

In order to clearly describe each orientation in the following embodiments, some orientation words may be used. For example, a coordinate system in FIG. 1-D defines each of orientation directions of a battery. An x-direction represents a lengthwise direction of a battery cell 400, a y-direction is perpendicular to the x-direction in a horizontal plane, and represents a width direction of the battery cell 400, and a z-direction is perpendicular to the x-direction and y-direction, and represents a height direction of the battery. In addition, expressions such as the x-direction, the y-direction, and the z-direction described above, which are used for describing indication directions of operations and configurations of members of a battery in the present embodiment, are not absolute but rather relative. Although these indications are appropriate when the members of the battery are located as shown in the figures, these directions should be interpreted differently when these positions are changed in order to correspond to the changes.

On the basis of the same understanding of the orientations, in the description of the present application, the orientation or position relationships indicated by the terms "central", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", etc. are based on the orientation or position relationships shown in the accompanying drawings, and are merely for facilitating the description of the present application and simplifying the description, rather than indicating or implying that the device or element referred to must have a specific orientation or be constructed and operated in a specific orientation, and therefore may not be interpreted as limiting the present application.

Rechargeable batteries may be referred to as secondary batteries or power batteries. Currently, the widely-used rechargeable batteries are lithium batteries, such as lithium-sulfur batteries, sodium/lithium ion batteries, or magnesium ion batteries, but are not limited thereto. The rechargeable batteries may be collectively referred to as batteries herein for convenience of description.

A safety characteristic of the battery plays an important role in evaluating the battery, and it is necessary to ensure the safety of the battery as much as possible when the battery is being used or charged.

The battery is generally formed by connecting and combining a plurality of battery cells. When being subjected to the external short circuit, overcharge, acupuncture, plate impact, etc., the battery cell is prone to thermal runaway caused by overheating. During thermal runaway, emissions will be generated inside the battery cell. The emissions contain high-temperature flue gas (even open flames), a volatile high-temperature electrolyte, etc., and generate thermal diffusion during emission, which leads to the thermal runaway, and even accidents such as explosion, of other battery cells.

In order to predict the possibility of explosion caused by overheating, and avoid the thermal runaway of the battery cell, currently, an effective solution is to provide a temperature sensing structure to monitor the temperature of the battery cell in real time, so as to give an alarm in a timely manner when the temperature of the battery cell is too high or reaches a threshold, which reduces the probability of overheating of the battery cell.

The temperature sensing structure is generally provided with a temperature sensing chip, and the temperature sensing chip is generally directly integrated on a bus bar, a voltage acquisition apparatus, a thermal management pipeline, etc. by dispensing, welding, structural fixing, etc. The connection manners described above belong to a one-time connection manner, lack replaceability, and have a poor universality, and a low quality reliability. Once the temperature sensing chip fails during a service cycle, it is very likely to cause the battery cell, even the entire battery to be scrapped, and even to cause safety problems. Moreover, the temperature sensing structure and a signal transmission apparatus are also integrally designed, so that when certain apparatus is damaged, another apparatus and even the battery are very likely to be scrapped.

In view of the above, the present application provides a battery, which changes a manner for connecting a temperature sensing chip to a battery cell, and a manner for connecting the temperature sensing chip and a signal transmission apparatus, to improve the replaceability of the temperature sensing chip and the replaceability and compatibility of the signal transmission apparatus connected to the temperature sensing chip, so as to facilitate the maintenance of the battery and the replacement of a failure apparatus, and reduce the cost of the battery and the scrapping probability of the entire battery.

The battery in the embodiment of the present application may be applied to various power consuming devices using electric energy as a power source. The power consuming device herein may be, but is not limited to, an electric vehicle, an electric train, an electric bicycle, a golf cart, an unmanned aerial vehicle, a steamship, etc. Also, the power consuming device may be a device which is powered only by the battery, or a hybrid device. The battery supplies electric energy to the power consuming device, and an electric device is driven by an electric motor to advance.

For example, as shown in FIG. 1-A, which is a schematic structural diagram of a power consuming device according to an embodiment of the present application. The power consuming device may be a vehicle, which may be a fuel vehicle, a gas vehicle, or a new energy vehicle. The new energy vehicle may be a battery electric vehicle, a hybrid electric vehicle, an extended-range vehicle, etc. The vehicle comprises a battery 200, a controller 210, and a motor 220. The battery 200 is configured for supplying power to the controller 210 and the motor 220 as a power source for operating and driving the vehicle. For example, the battery 200 is configured for meeting working power consuming requirements of the vehicle during starting, navigating, and running. For example, the battery 200 supplies power to the controller 210, the controller 210 controls the battery 200 to supply power to the motor 220, and the motor 220 receives and uses the power from the battery 200 as the power source for driving the vehicle, replacing or partially replacing fuel or natural gas which supplies driving power to the vehicle.

In order to make the battery achieve a high function to meet use requirements, the battery 200 may comprises a plurality of battery modules that are electrically connected to each other. As shown in FIG. 1-B, the battery 200 comprises a first case 201, a second case 202, and a plurality of battery modules 300. The first case 201 is snap-fitted to the second case 202, and the plurality of battery modules 300 are arranged in a space enclosed by the first case 201 and the second case 202. In some embodiments, the first case 201 is in sealed connection with the second case 202.

As shown in FIG. 1-C, the battery module 300 comprises a plurality of battery cells 400. The plurality of battery cells 400 may be electrically connected to each other in series, in parallel, or in series and parallel, to achieve a large current or voltage. The series-parallel connection refers to a combination of the series connection and the parallel connection. For example, as shown in FIG. 1-C, the battery cell 400 may be placed upright. The battery cell 400 has a height direction consistent with a z-direction. The battery cell 400 has a lengthwise direction consistent with an x-direction. In a width direction of the battery cells, the plurality of battery cells 400 are provided side by side in a y-direction. Alternatively, the battery cell 400 may be placed flat. The battery cell 400 has a width direction consistent with the z-direction. The battery cell 400 has a lengthwise direction consistent with the x-direction. The plurality of battery cells 400 may be stacked into at least one layer in the z-direction, and each layer comprises a plurality of battery cells 400 provided at intervals in the x-direction.

In order to make those skilled in the art clearly understand the improvement of the present application, the overall structure of the battery cell 400 is first described.

As shown in FIG. 1-D, the battery cell 400 comprises a housing 40, an electrode assembly 30, and an end cap assembly 10. The end cap assembly 10 comprises an end cap plate 10', the end cap plate 10' being connected (for example, welded) to the housing 40, to form a shell of the battery cell 400. The electrode assembly 30 is provided in the housing 40, and an electrolyte is filled into the housing 40. The battery cell 400 may be cubic, rectangular, or cylindrical.

One or more electrode assemblies 30 may be provided according to actual use requirements. As shown in FIG. 1-D, it is also possible to provide at least two independently wound electrode assemblies 30 in the battery. A main body portion of the electrode assembly 30 may be formed by winding or stacking a first plate, a second plate, and a separator located between the first plate and the second plate which are adjacent to each other together. The separator is an insulator interposed between the first plate and the second plate which are adjacent to each other. In the present embodiment, the first plate and the second plate are described as a positive electrode plate and a negative electrode plate, respectively, as an example. A coated area of the positive electrode plate is coated with a positive electrode active material, and a coated area of the negative electrode plate is coated with a negative electrode active material. A plurality of uncoated areas extending from the coated areas of the main body portion are stacked as an tab 301. The electrode assembly 30 comprises two tabs 301, that is, a positive tab and a negative tab. The positive tab extends from the coated area of the positive electrode plate, and the negative tab extends from the coated area of the negative electrode plate.

The end cap assembly 10 is provided at the top of the electrode assembly 30. As shown in FIG. 1-D, the end cap assembly 10 comprises an end cap plate 10' and two electrode terminals 5. The two electrode terminals 5 are a positive terminal and a negative terminal, respectively, and each of the electrode terminals 5 is correspondingly provided with one connection member 20, the connection member 20 being located between the end cap plate 10' and the electrode assembly 30.

For example, the tab 301 of the electrode assembly 30 in FIG. 1-D is located at the top, the positive tab is connected to the positive terminal by means of one connection member 20, and the negative tab is connected to the negative terminal by means of the other connection member 20. Optionally, the battery cell 400 may comprise two end cap assemblies 10 provided at two ends of the housing 40, respectively, each of the end cap assemblies 10 being provided with one electrode terminal 5.

An explosion-proof member may also be provided on the end cap plate 10', so that when existing in the battery cell 400, excessive gas in the battery cell 400 is released in a timely manner, which avoids explosion.

An exhaust hole is provided in the end cap plate 10', and may be provided in the middle of the end cap plate 10' in a lengthwise direction thereof. The explosion-proof member comprises a pressure relief mechanism 6. The pressure relief mechanism 6 is provided on the exhaust hole. In a normal state, the pressure relief mechanism 6 is mounted on the exhaust hole in a sealed manner. When the battery cell 400 expands to rise gas pressure in the shell to exceed a preset value, the pressure relief mechanism 6 is actuated to be opened to release gas outwardly by means of the pressure relief mechanism 6.

In some embodiments, as shown in FIG. 1-D, a through hole for injecting an electrolyte into the battery cell 400 is provided in the end cap plate 10', and may be a circular hole, an elliptical hole, a polygonal hole, etc., and extend in a height direction Z of the end cap plate 10'. A filling member 2 for sealing the through hole is provided on the end cap plate 10'.

An embodiment of the present application provides a battery, having the same basic structural layout as the battery 200 described above, and comprising a battery cell 400. The number of the battery cell 400 provided may be changed according to actual situations, which is not specifically limited in the embodiment of the present application.

Differently, in the embodiment of the present application, the battery further comprises a temperature sensor, a sensor mounting assembly, and a signal transmission component, the temperature sensor being configured for measuring the temperature of the battery cell; the sensor mounting assembly being configured for mounting the temperature sensor; and the signal transmission component being configured for being electrically connected to the temperature sensor to transmit a temperature signal of the battery cell, and being detachably connected to the sensor mounting assembly.

Figure 3:
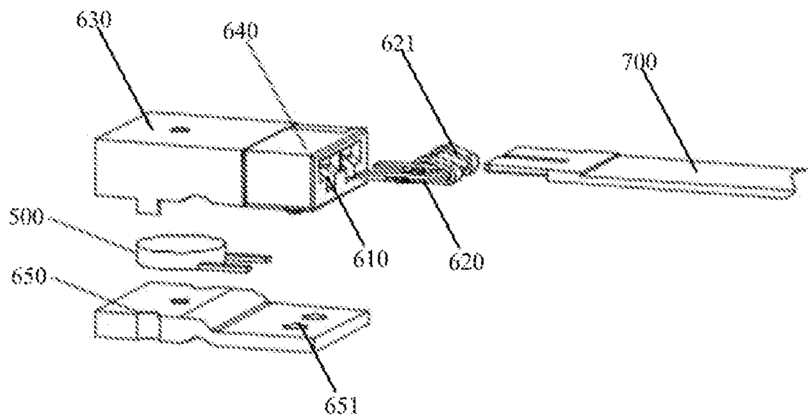
FIG. 3 is an exploded view of the structure in FIG. 2.
Figure 4:
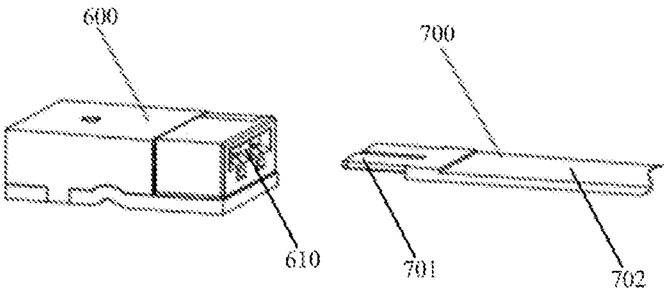
FIG. 4 is a schematic disassembly diagram of the sensor mounting assembly and the signal transmission component in FIG. 2.

With reference to FIGS. 2 and 3, schematic diagrams of structures and position relationships of the temperature sensor 500, the sensor mounting assembly 600, and the signal transmission component 700 are shown. In the embodiment of the present application, the temperature sensor 500 is mounted in the sensor mounting assembly 600, the temperature sensor 500 is electrically connected to the signal transmission component 700, and the signal transmission component 700 is configured for transmitting a temperature signal, measured by the temperature sensor 500, of the battery cell 400. Also, as shown in FIG. 4, the signal transmission component 700 is detachably connected to the sensor mounting assembly 600.

In the embodiment of the present application, the signal transmission component 700 is detachably connected to the sensor mounting assembly 600, which is conducive to the independent design, processing, maintenance, and replacement of the signal transmission component 700 and the sensor mounting assembly 600. For example, when the signal transmission component 700 is damaged, only the signal transmission component 700 is replaced. When the sensor mounting assembly 600 is damaged, only the sensor mounting assembly 600 is replaced. Moreover, the signal transmission component 700 may also be connected to the sensor mounting assembly 600 in a universal manner. In this way, one signal transmission component 700 may be adapted to various types of sensor mounting assemblies 600. Similarly, one sensor mounting assembly 600 may be adapted to various types of signal transmission components 700. Accordingly, the flexibility of selecting apparatuses in the battery is improved, and more types of apparatus may be used in the battery.

In the embodiment of the present application, the sensor mounting assembly 600 may also be detachably connected to the battery cell 400, so that when the temperature sensor 500 has a fault and is required to be detected or replaced, the sensor mounting assembly 600 may be directly removed from the battery cell 400, which improves the replaceability of the temperature sensor 500. On the basis of being replaceable, a universal manner for mounting the temperature sensor 500 on the sensor mounting assembly 600 may be provided, so that the types of the available temperature sensors 500 may be increased, and the universality of the temperature sensor 500 in the battery is thus improved.

In some embodiments, one of the sensor mounting assembly 600 and the battery cell 400 is provided with a snap-fit member, and the other one is provided with an engagement groove, the snap-fit member being connected to the engagement groove, so that the sensor mounting assembly 600 is detachably connected to the battery cell 400. Specifically, structural forms of the snap-fit member and the engagement groove may be determined according to actual situations, which is not specifically limited in the embodiment of the present application.

In the embodiment of the present application, in order to enable the signal transmission component 700 to be detachably connected to the sensor mounting assembly 600, as shown in FIG. 4, one side of the sensor mounting assembly 600 may be provided with a connection port 610, and the sensor mounting assembly 600 is detachably connected to the signal transmission component 700 at the connection port 610.

In some embodiments, in order to enable the temperature sensor 500 to be electrically connected to the signal transmission component 700, the sensor mounting assembly 600 further comprises a lead-out terminal 620, the lead-out terminal 620 being configured for connecting the temperature sensor 500 and the signal transmission component 700.

In the embodiment of the present application, in order to simplify the structure and improve the compactness of the entire structure, the lead-out terminal 620 may be provided at the connection port 610. The temperature sensor 500 is connected to the lead-out terminal 620, and the signal transmission component 700 is connected to the lead-out terminal 620, so that the temperature sensor 500 is electrically connected to the signal transmission component 700 to transmit a temperature signal.

In some embodiments, the temperature sensor 500 may be detachably connected to the lead-out terminal 620, so that the sensor mounting assembly 600 is detachably connected to the signal transmission component 700 at the connection port 610. Alternatively, the signal transmission component 700 may be detachably connected to the lead-out terminal 620, so that the sensor mounting assembly 600 is detachably connected to the signal transmission component 700 at the connection port 610. Alternatively, the temperature sensor 500 may be detachably connected to the lead-out terminal 620, and the signal transmission component 700 may be detachably connected to the lead-out terminal 620, so that the sensor mounting assembly 600 is detachably connected to the signal transmission component 700 at the connection port 610.

In the embodiment of the present application, the signal transmission component 700 is detachably connected to the lead-out terminal 620 as an example, to describe the case that the sensor mounting assembly 600 is detachably connected to the signal transmission component 700 at the connection port 610.

Figure 5:
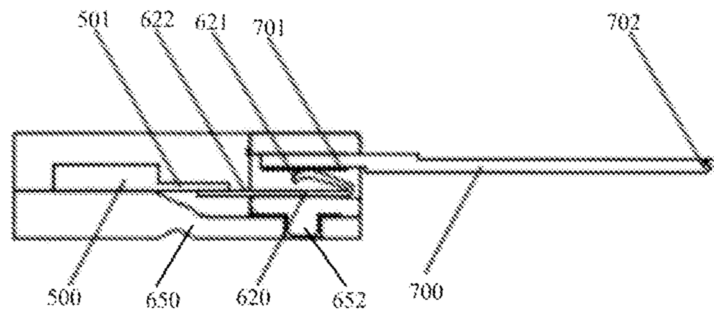
FIG. 5 is a side view of the structure in FIG. 2.

Specifically, with reference to FIG. 5, one end 622 of the lead-out terminal 620 is required to be connected to a pin 501 of the temperature sensor 500. For example, one end 622 of the lead-out terminal 620 and the pin 501 of the temperature sensor 500 may be fixedly connected to each other by dispensing, welding, crimping, bonding, structural fixation, etc., or may be detachably connected to each other by using a snap-fit connection, etc. Alternatively, the lead-out terminal 620 and the temperature sensor 500 may be integrally formed. A manner for connecting one end 622 of the lead-out terminal 620 and the pin 501 of the temperature sensor 500 is not specifically limited in the embodiment of the present application.

In the embodiment of the present application, in order to enable the other end of the lead-out terminal 620 to be detachably connected to the signal transmission component 700 at the connection port 610, the other end of the lead-out terminal 620 may be provided with an elastic connection portion 621, and the elastic connection portion 621 may be provided at the connection port 610. The signal transmission component 700 may be detachably connected to the elastic connection portion 621 by inserting the signal transmission component into the connection port 610.

In some embodiments, the signal transmission component 700 may be detachably connected to the elastic connection portion 621 in various manners, for example, in a snap-fit manner, etc.

In the embodiment of the present application, the elastic connection portion 621 is formed by bending the other end of the lead-out terminal 620. As shown in FIG. 3, In a specific forming process of the elastic connection portion 621, the other end of the lead-out terminal 620 may be bent towards one side surface of the lead-out terminal 620, and spaced apart from the side surface by a preset distance, to provide the other end of the lead-out terminal 620 with a certain elastic moving space, so that the signal transmission component 700 is detachably connected to the elastic connection portion 621. The preset distance may be determined according to the size and material of the lead-out terminal 620, which is not specifically limited herein.

Figure 10:
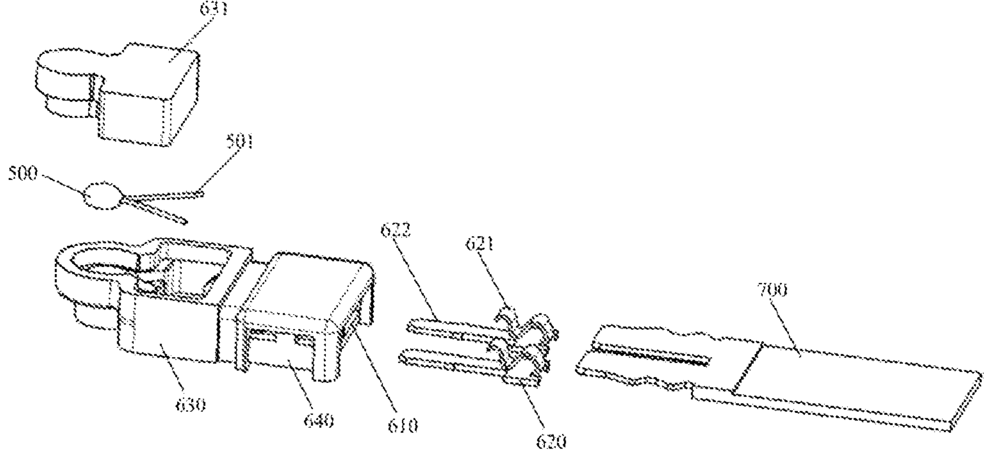
FIG. 10 is an exploded view of a sensor mounting assembly and a signal transmission component in a battery according to an embodiment of the present application.

In some embodiments, the elastic connection portion 621 may be obtained by bending the other end of the lead-out terminal 620 towards one side surface of the lead-out terminal 620 once, as shown in FIG. 3. Alternatively, as shown in FIG. 10, the elastic connection portion 621 may be obtained by bending the other end of the lead-out terminal 620 towards one side surface of the lead-out terminal 620 a plurality of times. The number of bending is not specifically limited in the embodiment of the present application.

In some embodiments, the lead-out terminal 620 may be of a structure made of a thin metal sheet and having certain elasticity, so as to ensure that the elastic connection portion 621 may elastically move in a certain space. As shown in FIG. 3, when both the lead-out terminal 620 and the signal transmission component 700 are inserted into the connection port 610, the elastic connection portion 621 having certain elasticity will press the signal transmission component 700 in the connection port 610. When the signal transmission component 700 is required to be removed, the signal transmission component 700 is directly pulled out of the connection port 610, and the elastic connection portion 621 will be deformed accordingly according to a force borne. The size and material of the lead-out terminal 620 are not specifically limited in the embodiment of the present application.

In some embodiments, the sensor mounting assembly 600 for mounting the temperature sensor 500 may have various structural forms. In order to make it more convenient for processing and maintaining of the sensor mounting assembly 600, in the embodiment of the present application, as shown in FIG. 3, the sensor mounting assembly 600 comprises a first housing 630 and a second housing 640 connected to each other, the first housing 630 being configured for arranging the temperature sensor 500, the second housing 640 being configured for arranging the connection port 610, and the lead-out terminal 620 being arranged at the connection port 610.

In some embodiments, a manner for connecting the first housing 630 and the second housing 640 may be provided according to actual requirements. As shown in FIG. 10, the first housing 630 and the second housing 640 may be integrally formed, by, for example, integral injection molding. Moreover, the first housing 630 is internally provided with an accommodation cavity for accommodating the temperature sensor 500. The temperature sensor 500 may be fixed in the accommodation cavity by means of a fixing mold 631, or by glue potting. The pin 501 of the temperature sensor 500 is provided towards the connection port 610 of the second housing 640. One end 622 of the lead-out terminal 620 is connected to the pin 501 of the temperature sensor 500 at the connection port 610. An inner shape of the fixing mold 631 matches the temperature sensor 500, an outer shape of the fixing mold 631 matches the accommodation cavity, and the fixing mold 631 may be fixedly connected to the first housing 630 by interference fit, etc., which is not specifically limited in the embodiment of the present application.

In the embodiment of the present application, as shown in FIGS. 3 to 8, in order to improve replaceability of the sensor mounting assembly 600, the first housing 630 may also be detachably connected to the second housing 640. When the first housing 630 or elements therein are damaged, only the first housing 630 is replaced, and when the second housing 640 or elements therein are worn, only the second housing 640 may be replaced, which reduces the maintenance cost.

In some embodiments, the first housing 630 may be detachably connected to the second housing 640 in various manners, for examples, in various snap-fit manners, etc. In the embodiment of the present application, as shown in FIG. 3, the battery may further comprise a thermally conductive member 650. The thermally conductive member 650 is mainly configured for transmitting the temperature of the battery cell 400 to the temperature sensor 500, so as to enhance thermal conductivity, and to make it convenient for the temperature sensor 500 to acquire the temperature of the battery cell 400.

In the embodiment of the present application, in addition to enhancing the thermal conductivity, the thermally conductive member 650 may be configured for connecting the first housing 630 and the second housing 640. Specifically, the first housing 630 may be detachably connected to the thermally conductive member 650, or the second housing 640 may be detachably connected to the thermally conductive member 650, or both the first housing 630 and the second housing 640 are detachably connected to the thermally conductive member 650.

In some embodiments, the first housing 630 and the second housing 640 may be detachably connected to the thermally conductive member 650 in various manners. As shown in FIGS. 3 and 5, a plurality of snap-fit holes 651 may be provided in the thermally conductive member 650, and snap-fit members 652 that may be engaged into the snap-fit holes 651 may be provided on the first housing 630 and the second housing 640, so that the first housing 630 and the second housing 640 may be detachably connected to the thermally conductive member 650. The first housing 630 and the second housing 640 may also be connected to the thermally conductive member 650 by gluing, etc.

Figure 6:
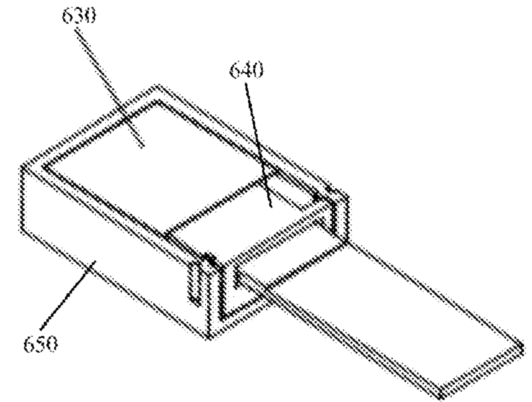
FIG. 6 is another schematic assembly diagram of a sensor mounting assembly and a signal transmission component in a battery according to an embodiment of the present application.
Figure 7:
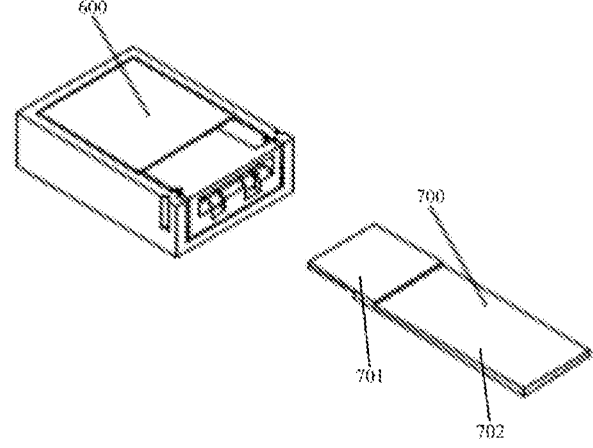
FIG. 7 is a schematic disassembly diagram of the sensor mounting assembly and the signal transmission component in FIG. 6.
Figure 8:
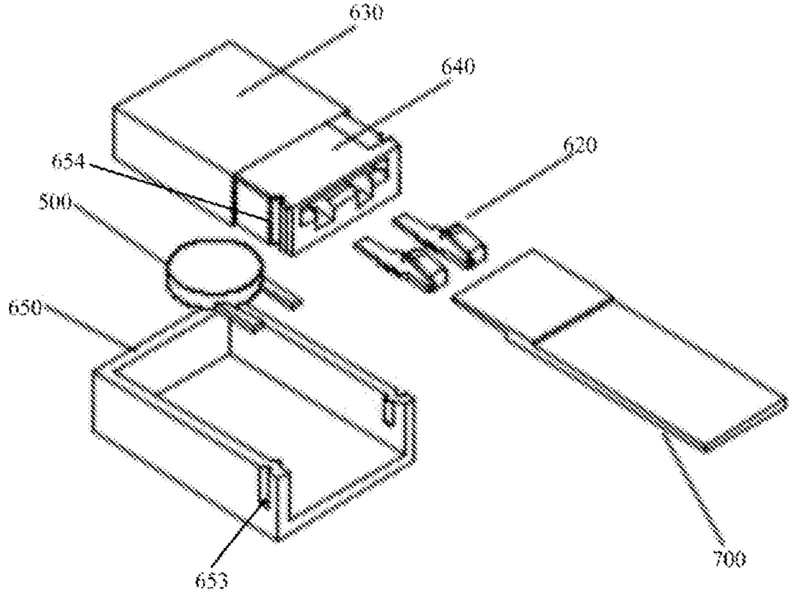
FIG. 8 is an exploded view of the structure in FIG. 7.

Alternatively, as shown in FIGS. 6 to 8, the thermally conductive member 650 may be provided with an accommodation groove, and the first housing 630 and the second housing 640 may be directly engaged in the accommodation groove, so that the first housing 630 and the second housing 640, may be detachably connected to the thermally conductive member 650. In order to facilitate a connection between the lead-out terminal 620 on the second housing 640 and the outside, an opening is also provided in one side of the thermally conductive member 650, so as to facilitate a connection between the signal transmission component 700 and the lead-out terminal 620.

In order to position the first housing 630 and the second housing 640 provided in the thermally conductive member 650 having the opening, a positioning engagement edge may be also provided on the thermally conductive member 650. Alternatively, as shown in FIG. 8, an engagement groove 653 is provided in the thermally conductive member 650, and a stop portion 654 that may be engaged into the engagement groove 653 is provided on the second housing 640. The first housing 630 and the second housing 640 may be prevented from sliding out of the thermally conductive member 650 by means of the cooperation between the stop portion 654 and the engagement groove 653.

Figure 9:
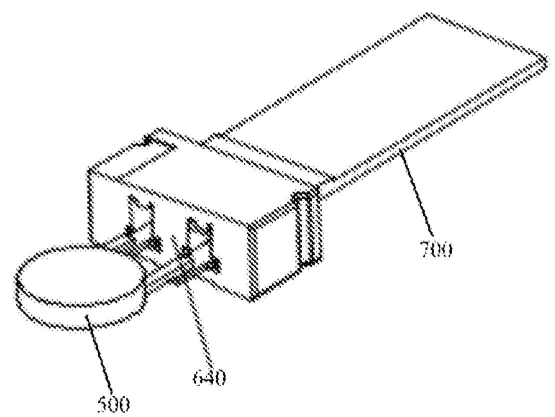
FIG. 9 is another schematic assembly diagram of a sensor mounting assembly and a signal transmission component in a battery according to an embodiment of the present application.

It should be noted that in actual use, in addition to the thermally conductive member 650, as shown in FIG. 9, only the second housing 640 is retained, and the temperature sensor 500 is directly fixed on the battery cell 400, so that the temperature sensor 500 is detachably connected to the signal transmission component 700. Therefore, the size of the entire structure may also be reduced, with a reserved space of the battery met. Certainly, the temperature sensor 500 in FIG. 9 may be directly engaged on the battery cell 400 by providing one or more buckle structures, etc. on the battery cell 400, so that the temperature sensor 500 is detachably connected. The buckle may have various structural forms, which is not specifically limited herein.

In some embodiments, the temperature sensor 500 may be a water drop head type temperature sensor, a patch type temperature sensor, etc. According to the specific shape of the temperature sensor 500, a structure for mounting or engagement of the temperature sensor 500 may be provided in the first housing 630, or the temperature sensor 500 may be directly fixed in the first housing 630 by glue sealing, glass sealing, etc. The structural form of the temperature sensor 500 and a manner for connecting the temperature sensor and the first housing 630 are not specifically limited in the embodiment of the present application.

In the embodiment of the present application, the second housing 640 is mainly configured for arranging the connection port 610, the connection port 610 may be directly engraved in the second housing 640, and a specific engraving process is not repeated herein.

In some embodiments, the number of connection ports 610 may be determined according to the number of lead-out terminals 620. In the presence of one lead-out terminal 620, only one connection port 610 is required to be provided. In the presence of a plurality of lead-out terminals 620, a plurality of connection ports 610 may be provided correspondingly, and the plurality of connection ports 610 may be provided at intervals. For example, a separation portion may be provided on the sensor mounting assembly 600. Specifically, the separation portion may be provided at the connection port 610, so as to separate adjacent lead-out terminals 620 from each other. Alternatively, a plurality of connection ports 610 which are provided at intervals may be directly engraved in the second housing 640, so as to separate adjacent lead-out terminals 620 from each other.

In some embodiments, the signal transmission component 700 may also have various structural forms. In the embodiment of the present application, as shown in FIGS. 4 and 7, the signal transmission component 700 comprises a contact end 701 and a transmission end 702 connected to each other, the contact end 701 being configured for being in contact connection with the lead-out terminal 620, and the transmission end 702 being configured for transmitting the temperature signal of the battery cell 400.

In some embodiments, the contact end 701 is connected to the lead-out terminal 620 by inserting the contact end into the connection port 610. The structural form of the contact end 701 may be determined according to the number of lead-out terminals 620. The end of the contact end 701 that is connected to the lead-out terminal 620 may be provided as an integral structure, or the end of the contact end 701 that is connected to the lead-out terminals 620 may be provided as a bifurcated structure, each branch corresponding to one lead-out terminal 620, so that connections between the contact end 701 and the lead-out terminals 620 are relatively separated from each other, which avoids the mutual interference. The contact end 701 is required to be made of metal having a signal transmission function, and the transmission end 702 may be any one or any combination of a wire, a flexible flat cable (FFC), a flexible printed circuit (FPC), a printed circuit board (PCB), etc.

In some embodiments, the contact end 701 may be connected to the transmission end 702 in various manners, such as crimping, welding, gluing, etc. The contact end 701 may also be snap-fitted to the transmission end 702, so as to facilitate detachment and replacement. A manner for connecting the contact end 701 and the transmission end 702 is not specifically limited in the embodiment of the present application.

Figure 11:
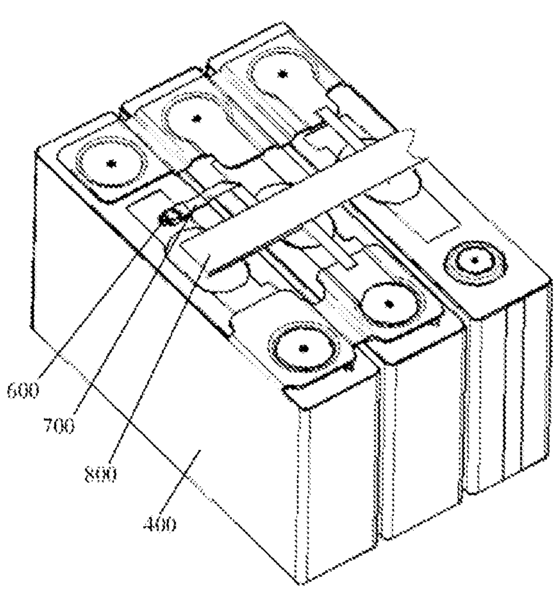
FIG. 11 is a schematic structural diagram of a battery provided with a sensor mounting assembly and a signal transmission component according to an embodiment of the present application.

With reference to FIG. 11, a schematic structural diagram of a battery cell 400 provided with the sensor mounting assembly 600 described above is shown. The sensor mounting assembly 600 is fixed at the top of the battery cell 400, the contact end 701 of the signal transmission component 700 is connected to the temperature sensor 500 in the sensor mounting assembly 600, and the transmission end 702 of the signal transmission component 700 is connected to a circuit board 800. The acquired temperature signal is converted into other communication signals by means of the circuit board 800 and transmitted to an external apparatus.

In another aspect, the present application further provides a power consuming device, comprising a battery 200 as described above. The battery 200 is configured for supplying electric energy. The specific structural form and working principle of the battery 200 have been described in detail in the embodiments described above, which is not repeated in the present embodiment.

In conclusion, according to the power consuming device in the embodiment of the present application, by providing the battery described above, the signal transmission component is detachably connected to the sensor mounting assembly, which is conducive to the independent design, processing, maintenance, and replacement of the signal transmission component and the sensor mounting assembly. Moreover, the sensor mounting assembly is detachably connected to the battery cell, so that when the temperature sensor has a fault and is required to be detected or replaced, the sensor mounting assembly may be directly removed from the battery cell, which improves the replaceability and compatibility of the temperature sensor to facilitate the maintenance of the battery and the replacement of a failure apparatus, and reduce the cost of the battery and the scrapping probability of the entire battery.

For the claimed subject described above of the present application and the features in the embodiments, reference may be made to each other, and those skilled in the art may also flexibly combine the technical features in different embodiments to form more embodiments as long as the structure is permitted.

The battery and the power consuming device provided by the present application are described in detail above. Specific embodiments are used for illustrating principles and implementations of the present application herein. The above description of the embodiments is only used for helping understand the method and its core concept of the present application. It should be noted that several improvements and modifications may also be made to the present application by those of ordinary skill in the art without departing from the principles of the present application, and should also fall within the scope of protection of the present application.

The invention claimed is:

1. A battery, comprising:

a battery cell;

a temperature sensor for measuring the temperature of the battery cell;

a sensor mounting assembly for mounting the temperature sensor; and a signal transmission component for being electrically connected to the temperature sensor to transmit a temperature signal of the battery cell, the signal transmission component being detachably connected to the sensor mounting assembly, wherein one side of the sensor mounting assembly is provided with a connection port, wherein the sensor mounting assembly further comprises a lead-out terminal provided at the connection port, the lead-out terminal being configured for connecting the temperature sensor and the signal transmission component, wherein the lead-out terminal has two ends, one end is connected to the temperature sensor, the other end is provided with an elastic connection portion, and the signal transmission component is inserted into the connection port and is detachably connected to the elastic connection portion, wherein the other end is bent towards a side surface of the lead-out terminal and spaced apart from the side surface by a preset distance to form the elastic connection portion.

2. The battery according to claim 1, wherein the sensor mounting assembly comprises a first housing and a second housing connected to each other, the temperature sensor being arranged at the first housing, and the lead-out terminal and the connection port being arranged at the second housing.

3. The battery according to claim 2, wherein the first housing is detachably connected to the second housing.

4. The battery according to claim 2, wherein the sensor mounting assembly further comprises a thermally conductive member, the thermally conductive member being configured for transferring the temperature of the battery cell to the temperature sensor.

5. The battery according to claim 4, wherein the first housing and/or the second housing are/is detachably connected to the thermally conductive member.

6. The battery according to claim 1, wherein the sensor mounting assembly comprises at least two lead-out terminals, and further comprises a separation portion, the separation portion being configured for separating adjacent lead-out terminals from each other.

7. The battery according to claim 1, wherein the signal transmission component comprises a contact end and a transmission end connected to each other;

the contact end is configured for being in contact connection with the lead-out terminal; and the transmission end is configured for transmitting the temperature signal of the battery cell.

8. The battery according to claim 1, wherein the sensor mounting assembly is detachably provided on the battery cell.

9. The battery according to any one of claim 8, wherein one of the sensor mounting assembly and the battery cell is provided with a snap-fit member, and the other one is provided with an engagement groove, the snap-fit member being connected to the engagement groove, so that the sensor mounting assembly is detachably connected to the battery cell.

10. A power consuming device, comprising a battery according to claim 9, the battery being configured for supplying electric energy.

11. The battery according to claim 2, wherein the first housing is internally provided with an accommodation cavity for accommodating the temperature sensor, the temperature sensor is fixed in the accommodation cavity by a fixing mold, an inner shape of the fixing mold matches the temperature sensor, an outer shape of the fixing mold matches the accommodation cavity, and the fixing mold is fixedly connected to the first housing by interference fit.

12. The battery according to claim 2, wherein the first housing is internally provided with an accommodation cavity for accommodating the temperature sensor, the temperature sensor is fixed in the accommodation cavity by glue potting, a pin of the temperature sensor is provided towards the connection port of the second housing, the one end of the lead-out terminal is connected to the pin of the temperature sensor at the connection port.

13. The battery according to claim 5, wherein a plurality of snap-fit holes are provided in the thermally conductive member, and a plurality of snap-fit members engageable into the snap-fit holes are provided on the first housing and the second housing, the first housing and the second housing are detachably connected to the thermally conductive member through engagement of the plurality of snap-fit holes and the plurality of snap-fit members.

14. The battery according to claim 5, wherein a plurality of snap-fit holes is provided in the thermally conductive member, and a plurality of snap-fit members engageable into the snap-fit holes is provided on the first housing and the second housing, the first housing and the second housing are detachably connected to the thermally conductive member through engagement of the plurality of snap-fit holes and the plurality of snap-fit members.

15. The battery according to claim 5, wherein the thermally conductive member is provided with an accommodation groove, and the first housing and the second housing are directly engaged in the accommodation groove, an opening is provided in one side of the thermally conductive member, so as to facilitate a connection between the signal transmission component and the lead-out terminal.

16. The battery according to claim 5, wherein an engagement groove is provided in the thermally conductive member, and a stop portion engageable into the engagement groove is provided on the second housing, the engagement groove and the stop portion are configured to cooperate to prevent the first housing and the second housing from sliding out of the thermally conductive member.

* * * * *